July 5, 1949.　　　　A. E. GLANCY　　　　2,474,837
WIDE APERTURE LENS SYSTEM HAVING MEANS
FOR REDUCING SPHERICAL ABERRATIONS
Filed March 8, 1945　　　　　　　　　　　　6 Sheets-Sheet 1

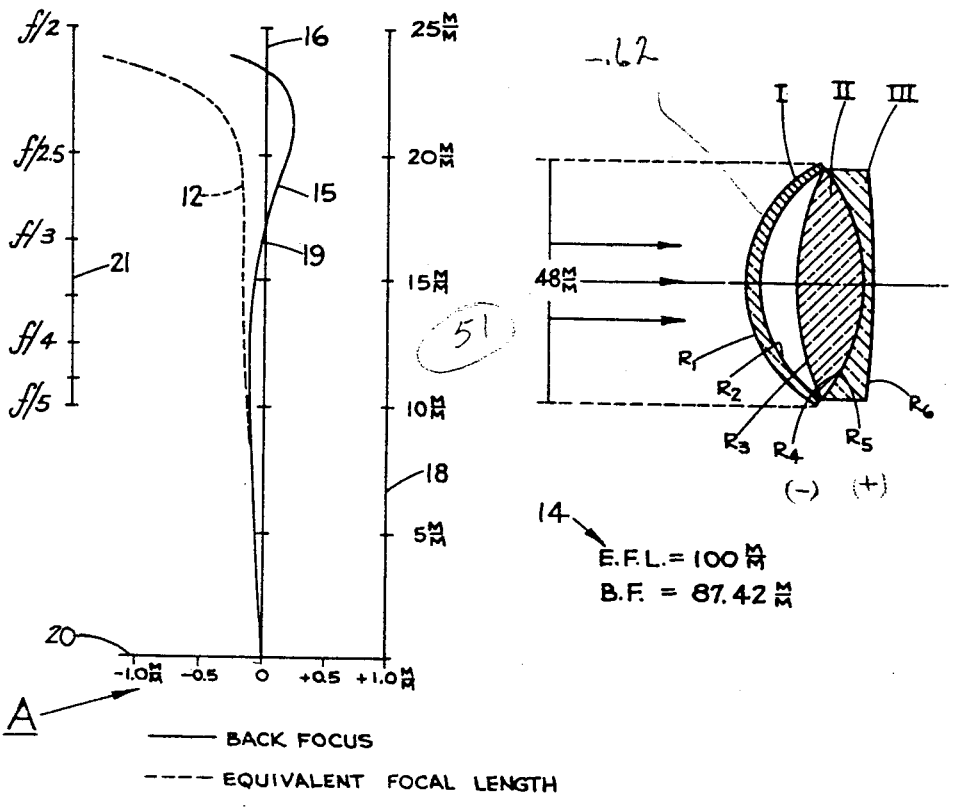

—— BACK FOCUS
---- EQUIVALENT FOCAL LENGTH

COLOR (F-C) UNDERCORRECTED  0.14 M/M

| LENS | GLASS | RADII | THICKNESS | SPACING |
|---|---|---|---|---|
| I | CROWN 1.5232 | $R_1$=27.649 M/M | 2.86 M/M | |
|  | V.= 58.6 | $R_2$=26.667 M/M | | |
|  |  |  |  | AIR SPACE 7.82 |
| II | (JENA) BAK-2 | $R_3$=52.839 | 12.87 | |
|  | 1.5400 |  |  |  |
|  | V.= 59.6 | $R_4$=39.805 |  |  |
|  |  |  |  | CEMENTED |
| III | (JENA) S.F.5 | $R_5$=39.805 | 1.91 |  |
|  | 1.6727 |  |  |  |
|  | V.= 32.2 | $R_6$ 190.68 |  |  |

A WIDE APERTURE TELESCOPE OBJECTIVE

*Fig. 1*

INVENTOR.
ANNA ESTELLE GLANCY
BY
Louis L. Gagnon
ATTORNEY

CHART M

| 1 | 2 | 3 | 4 | 5 |
|---|---|---|---|---|
| K | B.F. | | E.F.L. | |
| 0 | 87.42 MM | | 100.00 MM | |
| 10.66 MM | 87.33 " | -0.09 | 99.88 " | -0.12 |
| 15.07 " | 87.38 " | -0.04 | 99.86 " | -0.14 |
| 18.46 " | 87.51 " | -0.09 | 99.85 " | -0.15 |
| 21.32 " | 87.63 " | +0.21 | 99.72 " | -0.28 |
| 23.84 " | 87.13 " | -0.29 | 98.73 " | -1.27 |

CHROMATIC VARIATION OF SPHERICAL ABERRATION
IN THE SYSTEM ILLUSTRATED IN FIG. 1

INVENTOR.
ANNA ESTELLE GLANCY
BY
*Louis L. Gagnon*
ATTORNEY

The objective illustrated in Fig. 1 without the plano meniscus

INVENTOR.
ANNA ESTELLE GLANCY
BY
Louis L. Gagnon
ATTORNEY

OBJECTIVE WITHOUT PLANO MENISCUS RE-DESIGNED FOR REMOVAL OF SPHERICAL ABERRATION WITHOUT REGARD FOR COMA.

INVENTOR.
ANNA ESTELLE GLANCY

Patented July 5, 1949

2,474,837

UNITED STATES PATENT OFFICE 2,474,837

WIDE APERTURE LENS SYSTEM HAVING MEANS FOR REDUCING SPHERICAL ABERRATIONS

Anna Estelle Glancy, Sturbridge, Mass., assignor to American Optical Company, Southbridge, Mass., a voluntary association of Massachusetts Application March 8, 1945, Serial No. 581,621

4 Claims. (Cl. 88—57)

This invention relates to lens systems and has particular reference to novel systems of increased aperture ratio having means for reducing the higher order of spherical aberrations.

This application is a continuation in part of my copending application Serial No. 414,495, filed October 10, 1941 and which has become Patent 2,371,165, dated March 13, 1945.

One of the principal objects of the invention is to produce novel lens systems having a much wider aperture than has been possible to obtain in systems of this nature in the past.

Another important object is to provide known combinations of lens elements for obtaining lens systems having desired optical characteristics with an additional lens element which is of substantially zero power and which may be provided with steep curves to enable the changing of the vergency of the light rays off the axis by a large amount and then substantially restoring the vergency, which lens element may be varied according to or in conjunction with the other elements of the system to correct spherical aberration.

Another object is to provide a weak meniscus element in a lens system which may be employed in the correcting of spherical aberration of said system and which will have a power which is less than five per cent of the resultant power of the lens system.

Another object is to provide a lens system which has improved spherical aberration and sine condition.

Another object is to provide novel lens systems embodying a substantially zero or low power deeply curved meniscus element in combination with the main lens elements of the system with said various elements having their indices of refraction, surface curvatures and thicknesses so controlled that when combined with said meniscus element the said system will result in a wider or increased aperture with a decrease in spherical aberration.

Other objects and advantages of the invention will become apparent from the following description taken in connection with the accompanying drawings and it will be seen that many changes may be made in the details of construction, arrangement of parts shown and described without departing from the spirit of the invention as expressed in the accompanying claims. I, therefore, do not wish to be limited to the exact details of construction and arrangement of parts shown and described as the preferred forms only have been given by way of illustration.

Lens systems are most commonly achromatic combinations of crown and flint glasses having the curvatures of the surfaces determined to give the system a definite focal length and at the same time reduce the spherical aberration and coma. Because of the limitation to glasses suitable with respect to indices of refraction and dispersive powers it rarely happens that such an objective is sufficiently free from spherical aberration of the higher orders to permit the diameter of the objective to be greater than ⅕ of the focal length.

With the present invention one is able to reduce the higher order of spherical aberration and coma to such an extent that the diameter of the objective may be $1/2.2$ of the focal length in contrast to the usual limit of ⅕.

In the particular example shown in Fig. 1 of the drawings the system consists of a convexo-concave meniscus element I of relatively steep curvatures, moderate thickness and having relatively no focal power, followed by a typical crown-flint cemented objective comprising elements II and III which the meniscus element contacts at the edge, leaving an air space at the center by reason of the greater curvature on the adjacent surface of the meniscus. This optical objective is achromatic, free from spherical aberration and coma and has an aperture ratio of approximately f/2.2. The residual spherical aberration within the usual tolerances is of the uncommon type, showing a reversal of the spherical aberration terms of higher order. The data of the system are as follows:

| Lens | Glass | Radii, mm. | Thickness, mm. | Spacing |
|---|---|---|---|---|
| I | Crown 1.5232<br>V.=58.6 | $R_1=27.649$<br>$R_2=26.667$ | 2.86 | |
| II | (Jena) BAK-2<br>1.5400<br>V.=59.6 | $R_3=52.839$<br>$R_4=39.805$ | 12.87 | Air Space 7.82<br><br>Cemented. |
| III | (Jena) S. F. 5<br>1.6727<br>V.=32.2 | $R_5=39.805$<br>$R_6=190.68$ | 1.91 | |

It has been found that the peculiar advantages of the invention as shown in Figs. 1 and 2 are due to the related spherical aberration of the two surfaces of the meniscus element I and their consequent effects upon the spherical aberration of the succeeding surfaces of the elements II and III.

Due to the complexity of the higher orders of spherical aberration, the algebraic expressions are either entirely unknown or those that are known are too complex to be of service to the lens designer except to a very limited extent. Therefore, in endeavoring to obtain a reduction of the spherical aberrations of the higher orders recourse must be taken to rigorous trigonometric computation which, when systematically applied to a series of designs of lens systems, gave the very unusual results in that a nearly zero power meniscus lens of a suitable thickness and depth of curve added to a partially corrected objective of the usual type gave a great reduction and control of the higher order spherical aberrations. The particular example shown in Fig. 1 is one that completely reverses the type of spherical aberration given by the objective without the nearly zero power correcting lens, as illustrated in Fig. 3.

This same method may be applied to many lens systems by changing the depth of curvature, position of the compensating or meniscus lens and its thickness.

The lens systems shown and described are only by way of illustration. The compensating or meniscus lens shown in the first example is contacting adjacent the edge for convenience in manufacture but the elements may be spaced if desired.

Referring to the drawings:

Fig. 1 shows the arrangement of lenses in a system with data for the construction of the particular wide aperture objective herein described.

In particular Fig. 1 shows the embodiment of the invention. The equivalent focal length of the system is approximately 100 mm. and the back focus is approximately 87.42 mm.

Figure 2:
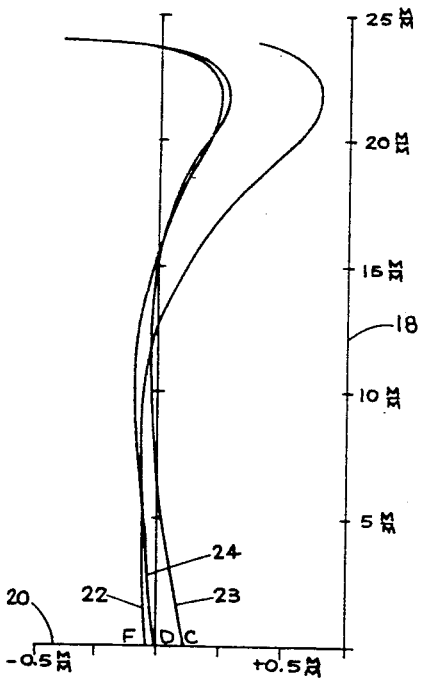
Fig. 2 shows curves for chromatic variation of the spherical aberration in the lens system illustrated in Fig. 1.

In Fig. 2 is shown the chromatic variation of the spherical aberration for the system in Fig. 1. This is about one-half as large as usually expected.

Figure 3:
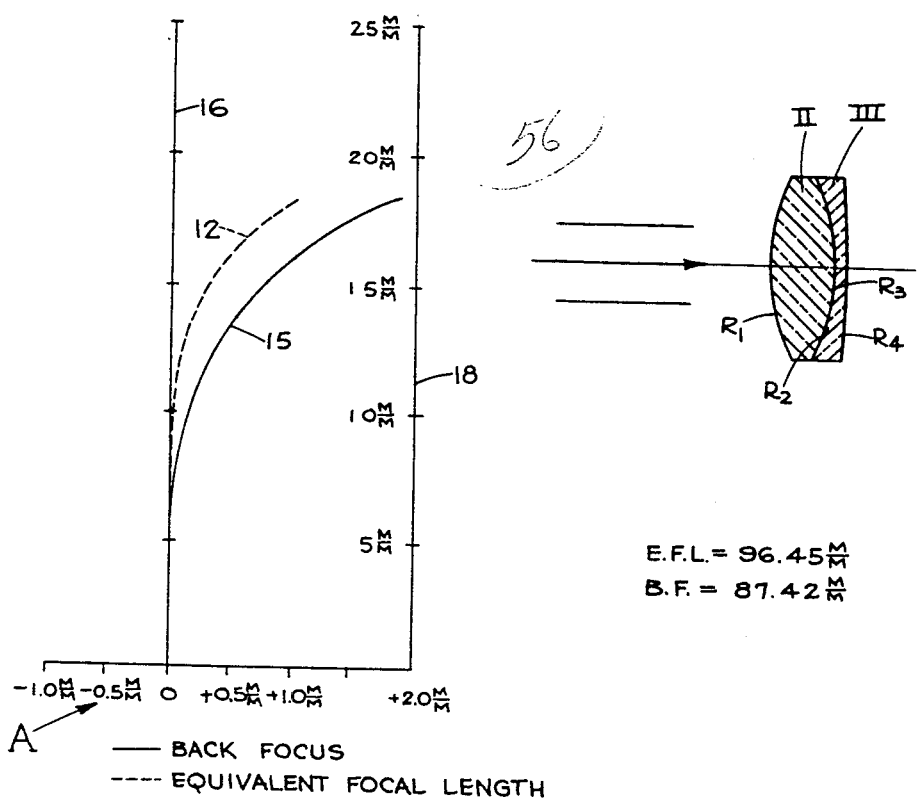
Fig. 3 shows objective, and other data for the objective illustrated in Fig. 1 without the plano-meniscus lens.

Fig. 3 discloses the data with reference to lens II and III of Fig. 1 without the compensating meniscus element I of Fig. 1. The equivalent approximate focal length of this system is 96.45 mm. instead of the 100 mm. of Fig. 1 but the back focus of both are the same. The curvatures and thickness of Fig. 3 in table B of said figure are the same as for lenses II and III of Fig. 1.

A comparison of the graphs for Fig. 1 and Fig. 3 shows that the meniscus element I, Fig. 1, moved both the zonal back focus and the zonal equivalent focal length to the left as shown in chart A, Fig. 1. This greatly reduces both the higher order spherical aberration and coma. Chart B, Fig. 4, gives the optical data for the fabrication of the lens system shown in said Fig. 4 which is a system of ordinary design which utilizes the same glasses as the lens elements II and III of Figs. 1 and 3.

Figure 4:
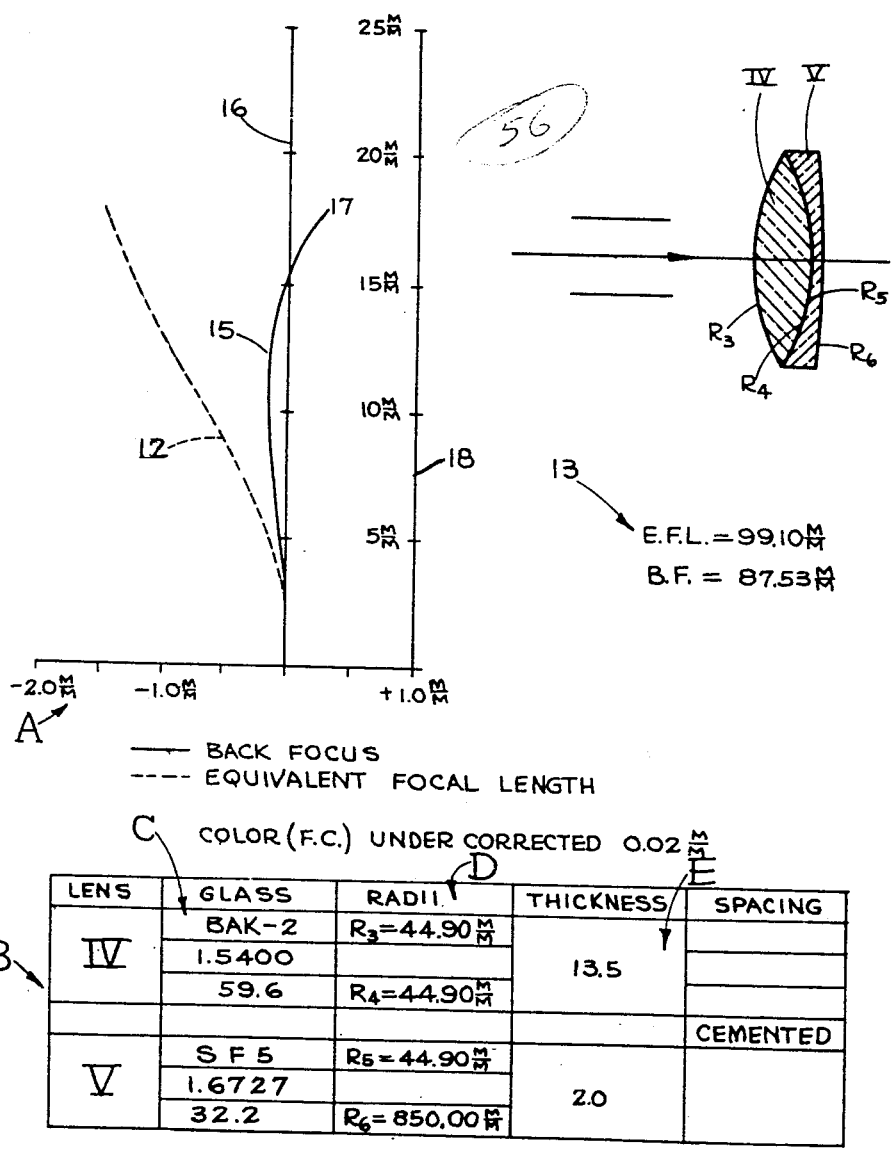
Fig. 4 shows an objective redesigned for removal of spherical aberration and of the prior art type not embodying a substantially zero power meniscus element.

Fig. 4 shows an objective using the same glasses as in Fig. 3 with the spherical aberration reduced to a good form for this pair of glasses with an equivalent approximate focal length of 99 mm. and a back focus of approximately 88 mm. It will be seen that the spherical aberration shown in Fig. 4, chart A becomes serious at a semi-aperture of just a little more than 15 mm. as indicated by the solid line 15 showing the back focus. The coma, as shown by the dash line 12 for equivalent focal length for different zones is not acceptable for an aperture greater than 20 mm.

Fig. 4 is given by way of illustration of how one of the past prior art types of lenses may be obtained for removal of spherical aberration. It will be noted that this lens comprises two elements IV and V. The element IV is formed of glass having, as shown in chart B, column C, an index of refraction of 1.5400 and a reciprocal relative dispersion of 59.6. This element IV, as shown in column D, has a front surface curvature $R_1$ of a radius of 44.90 mm. and a rear surface $R_2$ of a radius of 44.90 mm. with a central thickness of 13.5, as illustrated in column E of chart B. The element V, as illustrated in column C is of an index of refraction of 1.6727 and has an approximate reciprocal relative dispersion of 32.2. The surface $R_3$ has a radius of 44.90 mm. and the surface $R_4$ is of a radius of 850.00 mm., see column D of chart D. The central thickness of said element V as illustrated in column E of chart B is 2.0. The particular indices of refraction of these two elements IV and V and radii of curvatures of the surfaces thereof are selected because of their effectiveness in reducing or removing spherical aberration in a lens system of this nature.

The glasses of the elements IV and V are the same glasses utilized for forming the lens elements II and III of Fig. 1 and were selected for use in the example of the prior art lens illustrated in Fig. 4, in order to illustrate the best possible correction of spherical aberration which could be obtained with lens mediums of this nature without the use of a substantially zero power meniscus element such as illustrated in Fig. 1.

In order to reduce the spherical aberration the greatest possible amount, with glasses of this nature, care had to be exercised in computing the surface curvatures $R_1$—$R_4$ of said elements in order to give the best possible spherical aberration obtainable with such glasses.

It is to be noted that in chart A, Fig. 4, the full line 15, which represents the back focus of the lens system, crosses the axis 16 at about the 15 mm. scale mark which thereby designates that the spherical aberration is corrected for an aperture slightly greater than 30 mm. It is to be noted that the solid line 15, from 0 to 15, remains very close to the ordinate 16 which is important in a lens system of this nature. It is to be noted that the line 15 above the 15 mm. scale mark, as illustrated at 17, has a sharp departure from the ordinate 16. The equivalent focal length of the lens system, as illustrated by the dash line, departs sharply from the solid line 15 indicating that the lens system does not embody a correction for coma. It is to be noted, as illustrated at 13, that the equivalent focal length of the lens system is 99.10 mm. and that the back focus is 87.53 mm.

The lens system described above gives the best possible correction for spherical aberration with the particular glasses employed. It is to be noted that in the lens system of Fig. 1, which embodies the substantially zero power meniscus element I, the elements II and III are of sensibly the same index of refraction as the elements IV and V as the lens system of Fig. 4. The surface curvatures $R_3$—$R_6$ of said elements II and III, however, in order to have the desired cooperative function with the substantially zero power meniscus element I, have been modified as illustrated in column D of chart B, Fig. 1, so that the radius of curvature of the surface $R_3$ is 52.839 instead of 44.90 mm. as given in Fig. 4. The radius of curvature of the surface $R_4$ has been changed to 39.805 mm., the surface $R_5$ to 39.805 and the surface $R_6$ to 190.68 mm. These surface curvatures have been modified so that when combined with the surface curvatures $R_1$ and $R_2$ of the substantially zero power meniscus elements they will reduce the error of spherical aberration and coma to a minimum and increase the aperture ratio a considerable amount over that obtainable with the lens system of Fig. 4. It is to be noted that the center thicknesses of said elements IV and V, as illustrated in column E, see chart B, have been changed to the center thicknesses of the elements II and III of Fig. 1. This again is to produce the results desired.

With elements II and III formed of the particular indices of refraction set forth in column C of chart B in Fig. 1 and with the particular radii of curvatures and thicknesses given for said elements in columns D and E of said chart, it is essential in order to obtain the results desired to utilize a substantially zero power meniscus element I formed of glass having an index of refraction of 1.5232 and a reciprocal relative dispersion of 58.6 as illustrated in column C in chart B and having opposed surface curvatures $R_1$ and $R_2$ of 27.649 mm. and 26.667 mm. respectively as illustrated in column D of said chart and a center thickness of 2.86 mm. as illustrated in column E of said chart. As illustrated in column F of chart B the element I has a central spacing from element II which results in an air space of 7.82 mm. The resultant lens system of Fig. 1, as illustrated at 14 in Fig. 1, has an equivalent focal length of 100 mm. and a back focus of 87.42 mm.

In the well known manner of the art of lens design the back focus and the equivalent focal length are computed by rigorous trigonometric calculation for different zones of the lens. An example will make the graphs A of Figs. 1, 2, 3, and 4, clear. The figures under K in column 1 of chart M give the various distances from the axis of the lens system at which rays were selected for computation. The figures under B. F. in column 2 of chart M give the back focus for rays entering the lens system at the corresponding distances from the axis under K in column 1 of chart M. The axial back focus was subtracted from each one of these zonal back foci. The difference with its proper algebraic sign was placed in column 3 of chart M.

The equivalent focal length of each zone of the lens was computed and placed under E. F. L. in column 4 of chart M. The axial equivalent focal length was subtracted from each zonal equivalent focal length. The difference for each zone was placed in its proper position with proper algebraic sign in column 5.

For example: Rays entering the lens infinitely near the axis have a back focus of 87.42 mm. and an equivalent focal length of 100.00 mm. Rays entering the lens in a zone at a distance of 10.66 mm. from the axis have a back focus of 87.33 mm. The difference between this zonal back focus and the axial back focus is —0.09 mm. These same rays, entering the system at a distance of 10.66 mm. from the axis have an equivalent focal length of 99.88 mm. The difference between this zonal equivalent focal length and the axial equivalent focal length is —0.12 mm.

The charts A have a system of coordinates, lines 16 and 20. The origin of the system is the intersection of lines 16 and 20. The ordinates for both the solid line curve 15 and the dash line curve 12 are given in column 1 of chart M. The corresponding abscissas of the solid line curve 15 are found in column 3 of chart M. The abscissas for the dash line curve 12 are found in column 5 of chart M.

The chart M explains the construction of chart A, Fig. 1. All charts A are constructed in the same manner.

In all the graphs A the horizontal spread between the solid line curve 15 and the vertical axis 16 is the spherical aberration. The horizontal spread between the dash line curve 12 and the solid line curve 15 is the coma.

*Chart M*

| 1 | 2 | 3 | 4 | 5 |
|---|---|---|---|---|
| K | B. F. |  | E. F. L. |  |
| Millimeters | Millimeters | Millimeters | Millimeters | Millimeters |
| 0 | 87.42 |  | 100.00 |  |
| 10.66 | 87.33 | —0.09 | 99.88 | —0.12 |
| 15.07 | 87.38 | —0.04 | 99.86 | —0.14 |
| 18.46 | 87.51 | +0.09 | 99.85 | —0.15 |
| 21.32 | 87.63 | +0.21 | 99.72 | —0.28 |
| 23.84 | 87.13 | —0.29 | 98.73 | —1.27 |

At the left hand side of chart A, Fig. 1 is a supplementary scale, line 21, which gives the aperture ratio for any corresponding semi-diameter of the lens on scale 18. This is readily seen from an example. Let the distance of a ray from the axis be 10 mm. on scale 18. Then a lens having the semi-diameter of 10 mm. includes all rays parallel to the axis and at a distance not greater than 10 mm. from the center of the lens. The diameter is then 20 mm. and since the focal length (E. F. L.) is 100 mm. the aperture ratio is by definition $20/100$ that is $\frac{1}{5}$, i. e. the diameter of the lens is $\frac{1}{5}$ the focal length. This is usually written f/5.

It is to be noted that at this above mentioned 10. mm. mark on scale 18 both the dash line curve and the solid line curve are very close to line 16, i. e., the lens system is very well corrected for both spherical aberration and coma for an aperture ration f/5. Furthermore it is to be noted that the semi-diameter can be increased even to 23 mm. and the lens is still well corrected for spherical aberration and fairly well for coma. This indicates a useful aperture ratio of approximately f/2.2.

The lens system of Fig. 1 embodying the elements I, II and III, as designated in chart A, results in an aperture of approximately f/2.2 and is corrected not only for spherical aberration but also for coma as is readily determined by the equivalent focal length 12 and the solid line 15 and the proximity of both to the line 16.

Fig. 2 illustrates the chromatic variation of the spherical aberration. It is common practice to compute the spherical aberration for the C line of the spectrum (red), the D line (yellow), and the F line (blue). It is important in an optical system which receives ordinary light that the colors, red, yellow, blue shall come to the same focus as nearly as possible. In Fig. 2 the graph mark D is the same as the full line curve 15 in chart A, Fig. 1. The ordinates and abscissas have the same meaning as in Fig. 1. The graph marked D in Fig. 2 is the spherical aberration of the lens of which the elements are given in charts B, C, D, E, in Fig. 1. The calculations are made with glass indices of refraction for the D line of the spectrum as is usual in the art. The graph marked C gives the spherical aberration, calculated with glass indices of refraction for the C line of the spectrum; the graph marked F gives the spherical aberration calculated with the glass indices for the F line of the spectrum. The horizontal spread between the graphs show how nearly the red, yellow, blue colors come to the same focus. To those skilled in the art of lens design it will be apparent that the spread between the curves is approximately one-half as great as is usual in this type of optical system, or, that the error commonly designated as the chromatic variation of the spherical aberration is about one-half as great as is usual.

Fig. 3, as stated above, illustrates the elements II and III of the lens system of Fig. 1 taken alone or without the substantially zero power meniscus element I. As shown in chart A of Fig. 3 the back focus, as designated by the full line 15, departs sharply from the axis 16 from adjacent the 10 mm. mark. The equivalent focal length, as illustrated by the dash line 12, departs from the back focus line 15 at approximately the same 10 mm. point so that the system could not be considered corrected for coma and spherical aberration beyond approximately 26 mm. aperture.

By again referring to chart A of Fig. 1, when the substantially zero power meniscus element I is used in combination with the elements II and III, as illustrated in the lens system of Fig. 1, it will be noted that the back focus and equivalent focal length lines 15 and 12 respectively are brought closer together and caused to cling closely to the axis 16 throughout a greater effective aperture instead of a sharp departure from said axis line 16, as illustrated in chart A of Fig. 3 as results from the lens elements II and III alone. The lens system of Fig. 3 is intentionally designed to yield a type of spherical aberration that can be corrected by the use of the substantially zero power meniscus element I. The extent of the spherical aberration and coma introduced by the combined lens elements II and III is controlled as to this portion of the lens system so that it is possible for said spherical aberration and coma to be corrected or altered by the substantially zero power meniscus element in an amount sufficient to cause said spherical aberration and coma to be reduced to a minimum throughout a relatively large aperture therein, that is, each of the components of the lens system is computed with the other component in mind so as to obtain the resultant minimum spherical aberration and coma.

The lens system of Fig. 1 is substantially an achromatic lens system having achromatic characteristics substantially throughout the area of the aperture of the system.

The chart in Fig. 2 illustrates that the color from the F line 22 to the C line 23 is undercorrected approximately 0.14 mm. along the axis of the lens system and remains substantially corrected throughout the aperture. The computations for the lens system of Fig. 1 are all based on the D line or sodium line of the spectrum as is common practice in the art, which D line is illustrated at 24 in Fig. 2. In forming the lens system suitable pieces of lens medium having the indices of refraction required are first selected. The various surface curvatures for said respective pieces of lens medium are ground and polished thereon by the usual prior art methods and the lens elements are properly aligned in proper position with each other and are, in some instances, secured in said relation through cement joinder of the parts. It is to be understood that if desired the various elements may be mechanically connected; the important factor is that the said elements be in proper optical relation with each other as defined by the chart D in Fig. 1 for said system.

The zero power meniscus lens element I has but little altering effect as to axial chromatic aberration and thereby greatly simplifies the design of the lens system. It is to be understood that although only certain glasses have been described other glasses may be used with the appropriate change in surface curvatures, thicknesses and separations. It is advisable in a system like that disclosed in Fig. 1 to use crown and flint glass which are separated by a large difference in the index of refraction as this assists in reducing the variation in spherical aberration with color.

The meniscus lens I which is used can be of most any type of glass but it may be chosen to change the higher aberration for different colors if desired depending upon the dispersion of the glasses used. The glass actually chosen for the lens element I of Fig. 1 was the ordinary ophthalmic crown in common use for forming ophthalmic lenses.

This has an added advantage in that it does not require a special lens medium. The other two elements II and III are of the light barium crown and dense flint respectively.

Figure 5:
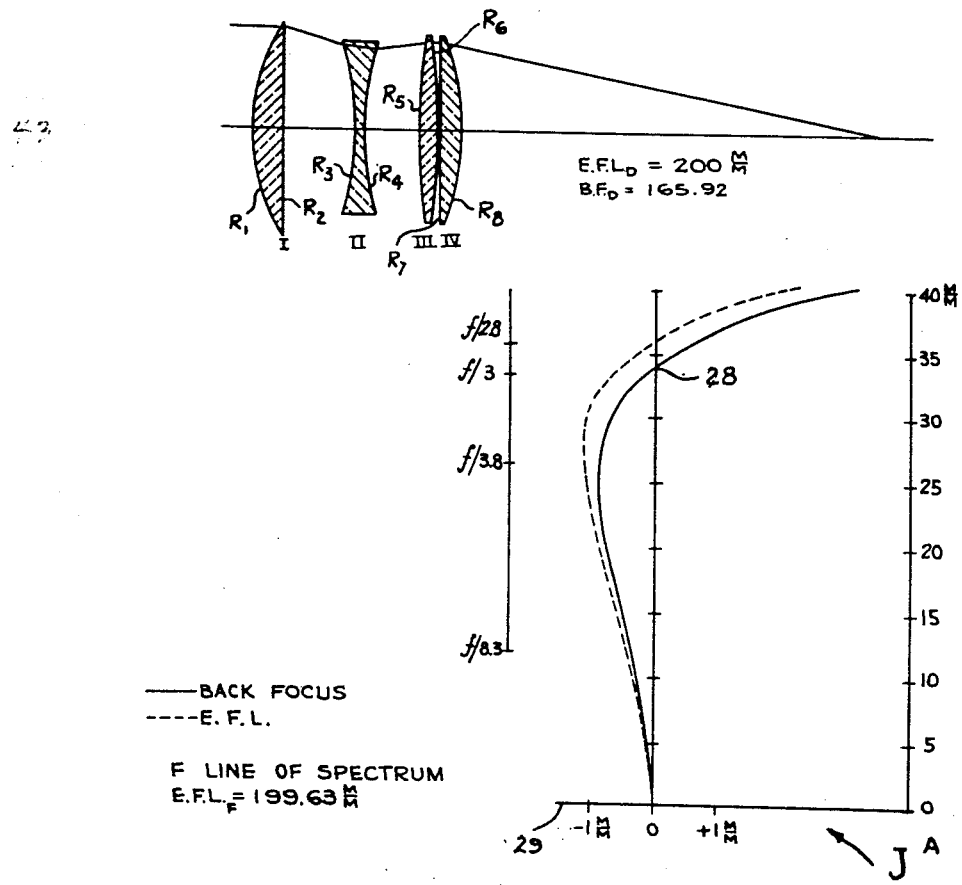
Fig. 5 shows a further prior art type of lens system.

In Fig. 5 there is illustrated an entirely different type of lens system than that of Fig. 3. This system is of the type shown and described in Patent No. 1,739,512 issued December 17, 1929, to H. W. Lee which is a modified Cooke type of system embodying a simple convex plus lens element I, a simple minus concave element II and a compound element embodying two plus lenses III and IV. Systems of this nature were designed with the thought of increasing the aperture and the patent referred to above lays claim to increasing the aperture from f/3 to f/2.5. The data of this system is as follows:

| Lens | Glass | Radii, mm. | Thickness, mm. | Spacing, mm. |
|---|---|---|---|---|
| I | Pittsburg DBC-2 | $R_1 = +85.180$ | 12.03 | |
| | | $R_2 = +1317.5$ | | 30.02 |
| II | Pittsburg EDF-1 | $R_3 = -109.71$ | 2.47 | |
| | | $R_4 = +84.946$ | | 24.06 |
| III | Pittsburg DBC-2 | $R_5 = +332.29$ | 6.07 | |
| | | $R_6 = -332.29$ | | 0.20 |
| IV | Pittsburg DBC-2 | $R_7 = $ Plano | 9.56 | |
| | | $R_8 = -95.638$ | | |

Pittsburg DBC-2:
 C 1.60774
 D 1.61088
 F 1.61842
 $G^1$ 1.62453
 $V_D = 57.2$

Pittsburg EDF-1:
 C 1.64359
 D 1.64900
 F 1.66279
 $G^1$ 1.67458
 $V_D = 33.8$

The present invention is directed particularly to a further increase in the aperture of a lens system of this nature.

The chart J of Fig. 5 illustrates the spherical aberration and coma of a system of this character. The chart K gives the physical characteristics for the fabrication of the lens system.

A marginal ray which enters the system parallel to the axis converges after refraction at the first lens I, diverges on emerging from the second lens II and converges finally to the focal point after passing through the lenses III and IV.

This system is corrected for spherical aberration but is subject to a considerable zonal variation of the spherical aberration.

It, therefore, is the zonal variation of the spherical aberration which I propose to improve. This improvement is necessary to make the system useful for longer focal lengths than would be otherwise possible. With a system such as disclosed by the patent to Lee, mentioned above, made to focus at 100 mm. it would have 0.35 mm. spherical aberration at f/3.9, and at f/3 it would have no spherical aberration. At f/2.8 it would have 0.3 spherical aberration of opposite sign and for greater aperture ratios the spherical aberration would increase very rapidly. For aperture ratio not greater than f/2.8 the definition of the image would not be affected appreciably. But if the focal length is 200 mm. the spherical aberration is doubled for the same aperture ratios. Hence in a 200 mm. system the marginal rays for an aperture ratio f/3.9 cross the axis 0.7 mm. in front of the focal plane and there results a measurable deterioration of the image. See diagram J.

It is proposed to insert a weak meniscus in one of the two air spaces with a view to altering the path of the rays sufficiently to reduce the zonal variation of the spherical aberration without changing appreciably the other characteristics of the system. Such a weak meniscus is shown at II of the lens system at the top of Fig. 6 which is a lens system of the type shown in Fig. 5 corrected according to the teachings of the invention. The data of such a system would be as follows:

| Lens | Glass | Radii, mm. | Thickness, mm. | Spacing, mm. |
|---|---|---|---|---|
| I | Pittsburg DBC-2 | $R_1=88.981$ | 11.76 | |
| | | $R_2=$Plano | | 19.56 |
| II | Pittsburg C-1 | $R_3=-63.727$ | 3.31 | |
| | | $R_4=-62.848$ | | 10.11 |
| III | Pittsburg EDF-1 | $R_5=-105.27$ | 3.30 | |
| | | $R_6=+87.507$ | | 22.63 |
| IV | Pittsburg DBC-2 | $R_7=+327.01$ | 5.93 | |
| | | $R_8=-429.28$ | | 0.20 |
| V | Pittsburg DBC-2 | $R_9=+801.84$ | 9.34 | |
| | | $R_{10}=-97.538$ | | |

Pittsburg DBC-2:
  C 1.60774
  D 1.61088
  F 1.61842
  $G^1$ 1.62453
  $V_D=57.2$ Pittsburg C-1:
  C 1.5203
  D 1.5230
  F 1.5292
  $G^1$ 1.5343
  $V_D=58.8$ Pittsburg EDF-1:
  C 1.64359
  D 1.64900
  F 1.66279
  $G^1$ 1.67458
  $V_D=33.8$ To do this it is necessary to have the path of the ray within the meniscus nearly horizontal and to have strong enough curves on the meniscus to give large angles of incidence and refraction at both surfaces.

For example, if the light entering the meniscus II is converging, the meniscus will be concave to the incident light and the two radii of curvature will be nearly alike. Conversely, if the incident light is divergent, the meniscus will be reversed. I may choose to insert a lens in either air space, that is, the air space between elements I and III or the air space between the elements III and IV as shown in Fig. 6.

If I choose the first arrangement, that is, to place the meniscus between the elements I and III, said meniscus will be of the type having its concave surface receiving the incident light. I have chosen the first air space because the rays from lens I are converging more rapidly than they are diverging from lens III so that the required large angles of incidence at the meniscus can be attained with less bending of the meniscus.

Figure 6:
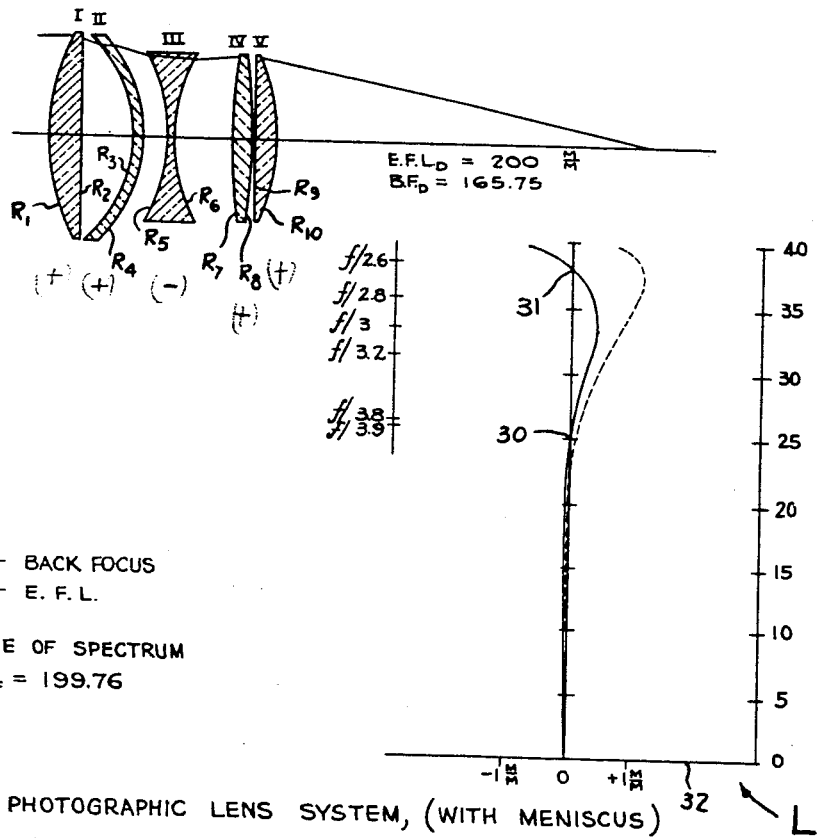
Fig. 6 shows the lens system of Fig. 5 modified to include a meniscus element.

The gist of the invention, therefore, as to the lens system shown in Fig. 1 and as to the lens system shown in Fig. 6 is to provide a meniscus lens element which in both instances is of substantially zero power and which has steep curves enabling the changing of the vergency of the light rays off the axis by a large amount and then substantially restoring the vergency thereby providing a lens component which may be varied according to the optical characteristics of the remainder of the system and which will provide means by which the spherical aberration may be further corrected beyond that possible with the initial lens systems to which such a meniscus lens has been added.

The exact curvatures required are determined by trial and error by means of trigonometric calculations for the whole system. The position of the meniscus within the air space is optional, but, in general, a given meniscus is more effective when it is closer to the first lens. This fact permits a small movement of the meniscus in making the final optical tests when the system is assembled.

An important consequence of the introduction of any lens, no matter how weak in power, is the disturbance of the corrections which the designer has laboriously worked out, such as color, first order spherical aberration and field. These corrections must be brought back by successive differential corrections of some or all of the radii and separations of the basic system.

Fig. 6 shows the design of the improved lens system. In comparing the diagrams J of Fig. 5 and L of Fig. 6 it is obvious that the spherical aberration curve is much better for the new system. In the prior art system the curve crosses the axis of the graph only once as shown at point 28 a little below f/2.8.

The focal variation at smaller apertures reaches a maximum of 0.85 mm. This is indicated by scale line 29.

In the new system the curve crosses the axis twice as illustrated at points 30 and 31 near f/3.8 and f/2.7. For aperture ratios less than f/3.8 the spherical aberration is never greater than 0.11 mm. as indicated by the scale line 32 and does not exceed 0.32 mm. unless the aperture ratio is greater than f/2.6. If we set 0.32 mm. as the maximum spherical aberration which is permissible, the new system has a useful aperture ratio f/2.6 against f/8.3 as shown in the prior art system of Fig. 5.

In the same sense the sine condition curve (dash line) shows great improvement over the prior art system.

It is more common to refer to these curves on a basis of 100 mm. focal length. For an objective 100 mm. focal length the spherical aberration and sine condition are one-half as great as shown in charts J and L, that is, the prior art system might be considered satisfactory as regards spherical aberration and sine condition if the focal length is 100 mm. whereas the new system can have more than twice as great a focal length and yet give as good images as the prior art system.

The great improvement in spherical aberration and sine condition is achieved at no expense to color correction or field curvatures or chromatic variation of the spherical aberration.

The lens systems, therefore, of Figs. 1 and 6 will have a much wider aperture than the systems of Figs. 3 and 5.

The physical characteristics of the lenses of the system of Fig. 6 is given in the table H and sets forth data simulating the data referred to in Fig. 1 in connection with the first described corrected lens system.

While the lens systems have been set forth as being formed of members or elements made of glass it is to be understood that the systems may utilize members made of any other transparent substance such as plastic or other resinous material.

The particular systems set forth employ optical systems of particular types, namely a telescope objective and a photographic system, but it is to be understood that a meniscus lens of substantially zero power may be utilized in other optical systems, for example, projection systems, microscopes, etc., for the purpose of giving increased aperture ratio with correction for spherical aberration and coma and chromatic variation of spherical aberration.

From the foregoing description it will be seen that simple, efficient and economical means and methods have been provided for accomplishing all of the objects and advantages of the invention.

Having described my invention, I claim:

1. An optical system corrected as to spherical aberration and coma, said system comprising an objective including at least one light converging positive lens component and one light diverging negative lens component separated by an air space, and a spherical corrector lens element of meniscus shape positioned in said air space with its concave side toward the positive lens component, the lens components of the objective having their surface curvatures, axial thicknesses, indices of refraction and spacing related to effect substantially all the focal power of the system and to simultaneously introduce an amount of spherical aberration and coma within a given aperture substantially compensated for by the corrector lens element, said corrector lens element having a thickness along its optical axis of less than .03 the focal length of the system, and the centers of curvature of its two surfaces being separated by approximately .01 of said focal length of the system, said corrector element effecting from approximately zero to .05 the focal power of the system, with the radii of its two curvatures being of such length as to introduce spherical aberration and coma of opposite sign to the spherical aberration and coma of the objective of an amount sufficient to cause spherical aberration and coma within said aperture to be substantially reduced.

2. An optical system corrected as to spherical aberration and coma, said system comprising an objective including a light converging positive lens component, a light diverging negative lens component and a second light converging positive lens component, said positive lens components each being separated from the negative lens component by an air space, and a spherical corrector lens element of meniscus shape positioned in one of said air spaces with its concave surface toward the positive lens component bounding one side of said air space, said lens components of the objective having their surface curvatures, axial thicknesses, indices of refraction and spacing related to effect substantially all the focal power of the system and to simultaneously introduce an amount of spherical aberration and coma within a given aperture substantially compensated for by the corrector lens element, said corrector lens element having a thickness along its optical axis of less than .03 the focal length of the system, and the centers of curvature of its two surfaces being separated by approximately .01 of said focal length of the system, said corrector element effecting from approximately zero to .05 the focal power of the system, with the radii of its two curvatures being of such length as to introduce spherical aberration and coma of opposite sign to the spherical aberration and coma of the objective of an amount sufficient to cause spherical aberration and coma within said aperture to be substantially reduced.

3. An optical system corrected as to spherical aberration and coma, said system comprising an objective including at least a frontal light converging positive lens component and a light diverging negative lens component separated from said positive lens component by an air space, and a spherical corrector lens element of meniscus shape positioned in said air space with its convex side toward the negative lens component and its concave side toward the incident light, the lens components of the objective having their surface curvatures, axial thicknesses, indices of refraction and spacing related to effect substantially all the focal power of the system and to simultaneously introduce an amount of spherical aberration and coma within a given aperture substantially compensated for by the corrector lens element, said corrector lens element having a thickness along its optical axis of less than .03 the focal length of the system, and the centers of curvature of its two surfaces being separated by approximately .01 of said focal length of the system, said corrector element effecting from approximately zero to .05 the focal power of the system, with the radii of its two curvatures being of such length as to introduce spherical aberration and coma of opposite sign to the spherical aberration and coma of the objective of an amount sufficient to cause spherical aberration and coma within said aperture to be substantially reduced.

4. An optical system corrected as to spherical aberration and coma, said system including an objective comprising positive and negative lens components having their surface curvatures, axial thicknesses, indices of refraction and spacing related to effect a focal power of nearly 1/F where F is the focal length of the system and to simultaneously introduce an amount of spherical aberration and coma within a given aperture substantially compensated for by the introduction of an additional lens element, said additional lens element being of spherical meniscus shape and positioned in coaxial relation with the lens components of the objective, said spherical corrector lens element having an axial thickness of less than .03F, having the centers of curvature of its two surfaces positioned substantially along the optical axis of the system and separated by approximately .01F, and effecting from approximately zero to .05 the focal power of the system, the first surface of said corrector element displacing the paths of the peripheral light rays of the system entrant therein relative to the optical axis and its second surface substantially restoring the direction of said peripheral light rays to paths substantially parallel to their paths before entrant into the corrector element, and with the paths of said light rays being displaced in a predetermined relation to the optical axis of the system as to cause spherical aberration and coma of opposite sign to the spherical aberration and coma of the objective and of amounts sufficient to substantially reduce spherical aberration and coma within said aperture.

ANNA ESTELLE GLANCY.

REFERENCES CITED

The following references are of record in the file of this patent:

UNITED STATES PATENTS

| Number | Name | Date |
|---|---|---|
| 635,473 | Goerz et al. | Oct. 24, 1899 |
| 1,035,408 | Beck | Aug. 13, 1912 |
| 1,077,420 | Minor | Nov. 4, 1913 |
| 1,580,751 | Merte | Apr. 13, 1926 |
| 1,739,512 | Lee | Dec. 17, 1929 |
| 1,812,717 | Rudolph | June 30, 1931 |
| 1,812,851 | Altman | July 7, 1931 |
| 2,158,507 | Konig | May 16, 1939 |

FOREIGN PATENTS

| Number | Country | Date |
|---|---|---|
| 1,583 | Great Britain | 1888 |
| 161,091 | Great Britain | Apr. 7, 1921 |
| 537,460 | France | Mar. 3, 1922 |